United States Patent [19]
Suzuki et al.

[11] Patent Number: 5,877,425
[45] Date of Patent: Mar. 2, 1999

[54] SEMICONDUCTOR-TYPE PRESSURE SENSOR WITH SENSING BASED UPON PRESSURE OR FORCE APPLIED TO A SILICON PLATE

[75] Inventors: Seiko Suzuki, Hitachiohta; Masayuki Miki, Hitachinaka; Satoshi Shimada, Hitachi; Masahiro Matsumoto, Hitachi; Masahiro Komachiya, Hitachi, all of Japan

[73] Assignee: Hitachi, Ltd., Japan

[21] Appl. No.: 771,922

[22] Filed: Dec. 23, 1996

[30] Foreign Application Priority Data

Dec. 26, 1995 [JP] Japan .................................. 7-338508

[51] Int. Cl.⁶ .................................. G01L 9/04; G01L 9/06
[52] U.S. Cl. .................................. 73/727; 73/726; 73/720; 73/35.12; 338/42
[58] Field of Search .............................. 73/727, 726, 721, 73/720, 35.12; 338/42, 4

[56] References Cited

U.S. PATENT DOCUMENTS

| 5,406,852 | 4/1995 | Hiraka et al. | 73/721 |
| 5,528,214 | 6/1996 | Koga et al. | 73/727 X |
| 5,683,594 | 11/1997 | Hocker et al. | 73/721 X |

*Primary Examiner*—Joseph L. Felber
*Attorney, Agent, or Firm*—Evenson, McKeown, Edwards & Lenahan, P.L.L.C.

[57] ABSTRACT

A combustion pressure sensor suitable for a highly precise combustion control system of an automobile engine and a sensing system using the sensor. The combustion pressure sensor includes a SOI substrate having a three-layered structure of a first silicon plate, a thermal oxide film, and a second silicon plate, wherein a combustion pressure is sensed on the basis of a pressure or a force applied to the first silicon plate.

15 Claims, 13 Drawing Sheets

SEMICONDUCTOR-TYPE PRESSURE SENSOR WITH SENSING BASED UPON PRESSURE OR FORCE APPLIED TO A SILICON PLATE

BACKGROUND OF THE INVENTION

The present invention relates to a sensor for sensing a pressure in a dirty and severe atmosphere, particularly, a combustion pressure of an automobile engine.

As combustion pressure sensors of this type, those using a piezoresistance effect of a silicon semiconductor substrate known, for example, from Japanese Patent Laidopen Nos. Hei 5-264390 and Hei 6-34475, have been already put in practical use. The combustion pressure sensor of this type has a configuration that a sensing portion composed of a silicon semiconductor substrate is separated from a dirty and severe combustion gas atmosphere at a high temperature, using a metal diaphragm. Specifically, a combustion pressure is converted into a force by means of the metal diaphragm, and is then transmitted to the silicon semiconductor substrate disposed at a relatively low temperature portion, at which the force is further converted into an electric signal.

The above-described prior art type pressure sensor is difficult to sense a combustion pressure in a state that the sensing portion is directly exposed to a dirty atmosphere in an automobile engine, which is raised at a high temperature and is rapidly varied in temperature, and is also brought in direct-contact with a combustion gas. In particular, the prior art pressure sensor has a disadvantage that there arises a significantly large sensing error due to a temperature effect exerted on the pressure sensor exposed to an environment raised at a high temperature and rapidly varied in temperature. Another problem is that the sensing portion exposed at a dirty environment at a high temperature is possibly broken for a short time, resulting in the degraded reliability. In addition, the prior art type pressure sensor is difficult to accurately sense abnormal combustion of an engine such as a knocking phenomenon because the sensing portion cannot be directly exposed to a combustion gas atmosphere. To be separated from the combustion gas atmosphere, the sensing portion must be manufactured into a large complex structure at a high cost. The prior art pressure sensor, having a large-sized sensing portion, is poor in mounting characteristic to an engine and is difficult to be mounted in each cylinder of the engine. Additionally, there has been not proposed yet an inexpensive signal processor circuit capable of sensing combustion pressures at a high accuracy when pressure sensors are individually mounted in all engine cylinders.

SUMMARY OF THE INVENTION

An object of the present invention is to provide an inexpensive combustion pressure sensor which is high in accuracy and value-added.

To achieve the above object, there is provided a semiconductor type combustion pressure sensor, which is composed of a sensing portion including: a silicon-on-insulator having a three-layered structure of a first silicon plate, a thermal oxide film, and a second silicon plate; a strain gauge portion formed from a portion of the silicon plate by etching; and an insulation substrate having a lead function, connected to the second silicon plate in such a manner as to seal the strain gauge portion; wherein the surface of the sensing portion is coated with a corrosion preventive material and/or an electric noise reducing material, and the sensing portion is directly exposed to a combustion gas atmosphere through a combustion pressure introducing hole. In the above sensor, a bonding part between the second silicon plate and the insulation substrate is divided into two bonding parts which are electrically and thermally insulated from each other and have different functions, one having a function for electrically connecting the strain gauge portion to a lead portion of the insulation substrate, the other having a function for hermetically sealing the strain gauge portion. Moreover, a group of switches may be provided between a group of combustion pressure sensors each mounted in respective engine cylinders and a signal processor circuit for processing signals transmitted from the combustion pressure sensors, wherein only the combustion pressure sensor of a specified cylinder is substantially electrically connected to the signal processor circuit in accordance with a combustion cycle.

DETAILED DESCRIPTION OF THE PREFERRED EMBODIMENTS

Hereinafter, preferred embodiments of the present invention will be described with reference to the accompanying drawings.

Figure 1:
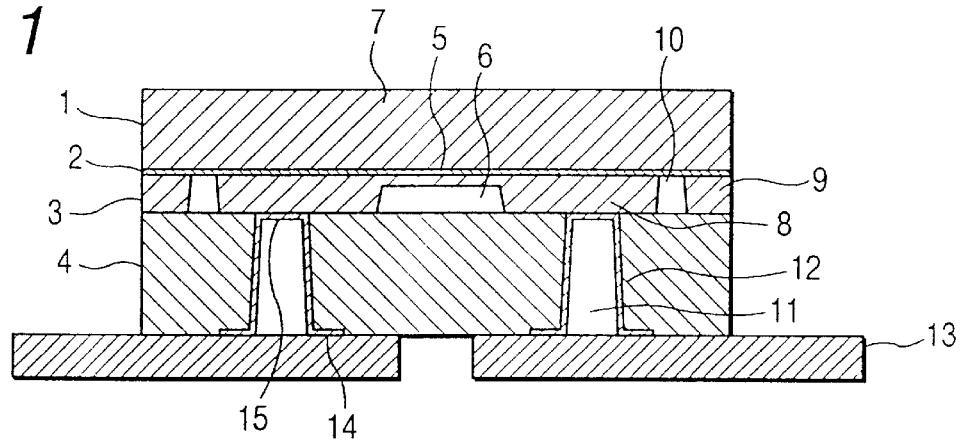
FIG. 1 is a view showing an embodiment of a silicon-on-insulator (SOI) semiconductor type combustion pressure sensor of the present invention.

FIG. 1 shows an embodiment of a silicon-on-insulator (hereinafter, referred to as "SOI") semiconductor type combustion pressure sensor of the present invention. A SOI substrate having a first silicon plate 1, a thermal oxide film 2, a second silicon plate 3 is hermetically bonded to an insulation substrate 4 formed of a Pyrex glass substrate by anodic bonding. The second silicon plate 3 is etched to form a strain gauge portion 5 and spaces 6, 10. A portion, over the strain gauge portion 5 and the space 6, of the first silicon plate 1 constitutes a diaphragm 7 which is deformed due to a combustion pressure. The SOI substrate is connected to the insulation substrate 4 through a supporting portion 8 electrically and mechanically connected to the strain gauge portion 5 and an outer frame portion 9 electrically insulated from the strain gauge portion 5. As shown in the figure, the strain gauge 5 is hermetically sealed by the first silicon plate 1 of the SOI substrate, the outer frame portion 9 and the insulation substrate 4. Accordingly the strain gauge portion 5 is simply separated from a combustion gas atmosphere if the sensing portion is directly exposed to the combustion gas atmosphere, with a result it is improved in its durability and is made extremely moderate in its temperature change even if the combustion gas pressure is rapidly changed. Schematic dimensions of respective elements of the sensing portion are as follows: the first silicon plate 1 has a thickness of about several hundred μm; the thermal oxide film 2 has a thickness of about one μm; the second silicon plate 3 has a thickness of about several ten μm; the strain gauge 5 has a thickness of about several μm; the insulation substrate 4 has a thickness of about several hundred μm; and a flat surface of the entire sensing portion has dimensions of about several μm×several μm. The insulation substrate 4 has through-holes 11, and the strain gauge portion 5 is electrically connected to an external signal processor circuit through the supporting portion 8, a conductive film 15 formed on a bottom surface of the supporting portion 8 by sputtering or deposition, a conductive film 12 formed on an inner surface of each through-hole 11, a conductive film 14 formed on an upper surface of the insulation substrate 4, and a metal lead 13 (for example, Fe—Ni alloy) connected to the insulation substrate 4. The insulation substrate 4 is bonded to the lead 13 by, for example, anodic bonding.

Figure 2:
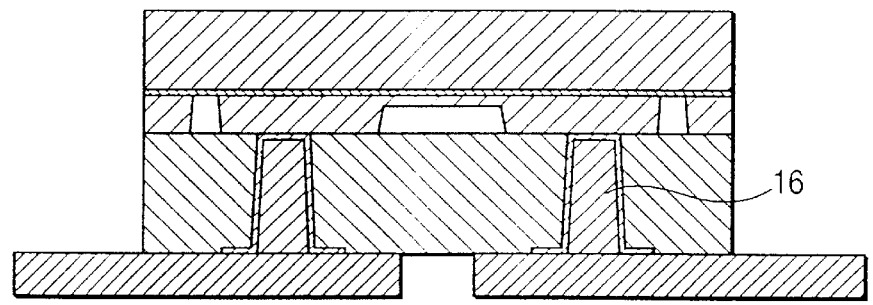
FIG. 2 is a view showing a modification of the embodiment shown in FIG. 1.

FIG. 2 shows a modification of the embodiment shown in FIG. 1. In this sensor, the through-hole 11 is filled with a conductive metal material 16 for improving a reliability in electric connection between the strain gauge portion 5 and an external signal processor circuit.

Figure 3:
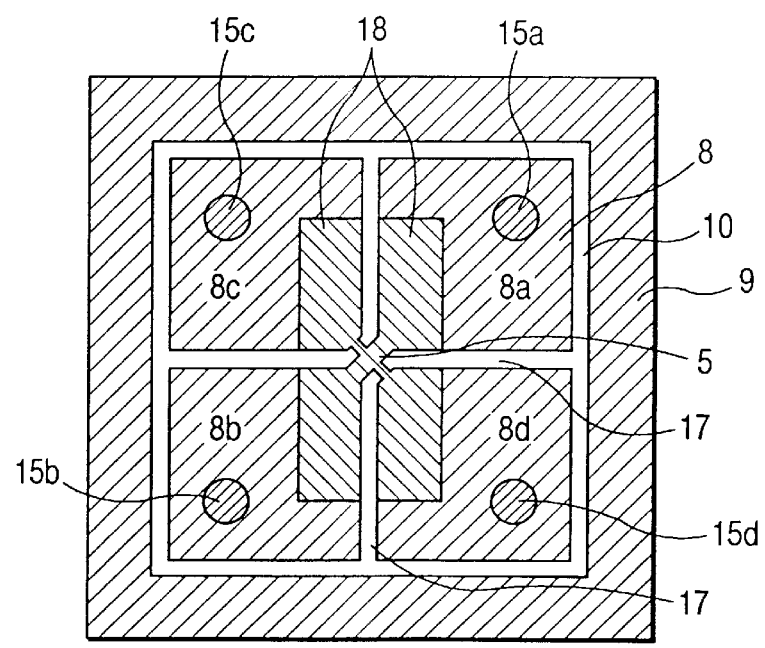
FIG. 3 is a plan view, seen from a strain gauge side, showing a SOI substrate according to one example of the embodiment shown in FIG. 1.

FIG. 3 is a plan view, seen from the space 6 side, showing the second silicon plate 3 of the SOI substrate according to one example of the embodiment shown in FIG. 1. In addition, in this figure and the subsequent figures, the same characters indicate the same elements or elements having the same functions. As shown in FIG. 3, the strain gauge 5 of an X-type is electrically connected to four supporting portions 8a, 8b, 8c and 8d through a thinned portion 18. The thinned portion 18 has the same thickness as that of the strain gauge portion 5, that is, about several μm. Of course, the thickness of the thinned portion 18 may be set such that an electric resistance of the supporting portion 8 and the thinned portion 18 is sufficiently smaller than that of the strain gauge portion 5, and thereby it may be designed to be intermediate between the thicknesses of the strain gauge portion 5 and the supporting portion 8. In addition, the electric resistance of the strain gauge portion 5 is designed at a value of from about several hundred Ω to several kΩ. A portion, over the thinned portion 18, of the silicon plate 1 constitutes the diaphragm 7. The thermal oxide film 2 is positioned under the spaces 10 and spaces 17, and as shown in the figure, the outer frame portion 9 is electrically insulated from the strain gauge portion 5. Reference numerals 15a, 15b, 15c and 15d indicate conductive films each formed on the supporting portions 8a, 8b, 8c and 8d. These conductive films are formed by sputtering or the like when the SOI substrate is bonded to the insulation substrate. A strain of the X-type strain gauge 5 is changed depending on a combustion pressure, and accordingly, when a voltage is supplied between the supporting portions 8a and 8b, a differential voltage proportional to the combustion pressure to be sensed is produced between the supporting portions 8c and 8d.

Figure 4:
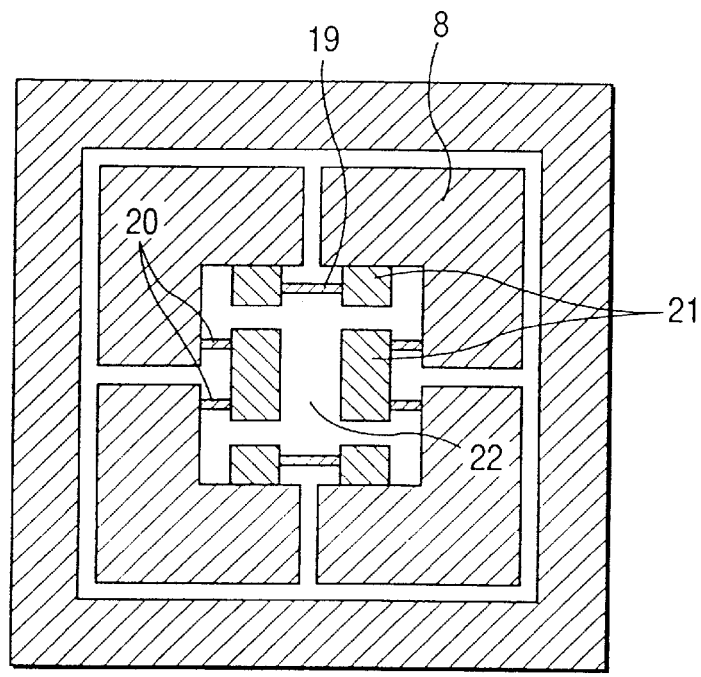
FIG. 4 is a plan view, seen from a strain gauge side, showing a SOI substrate according to another example of the embodiment shown in FIG. 1.

FIG. 4 is a plan view, seen from the space 6 side, showing the second silicon plate 3 of the SOI substrate according to another example of the embodiment shown in FIG. 1. In this example, a bridge type strain gauge is used. Specifically, gauges 19 extending in the tangential direction and gauges 20 extending in the radial direction are electrically connected to the supporting portion 8 through thick portions 21. In addition, the thickness of the thick portion 21 is set to be intermediate between thicknesses of the supporting portion 8 and the tangential gauge 19 or radial gauge 20. A portion over a space 22 constitutes a diaphragm portion which is deformed depending on a combustion pressure. The tangential gauges and the radial gauges are connected to each other in the known bridge circuit outside the sensing portion so as to obtain an output signal proportional to a combustion pressure. The second silicon plate 3 used for the X-type gauge shown in FIG. 3 and the bridge type gauge shown in FIG. 4 is made from a p-type single crystal wafer having a (100) face and also having a resistivity of from 0.01 to 1.0 Ω/m.

Figure 5:
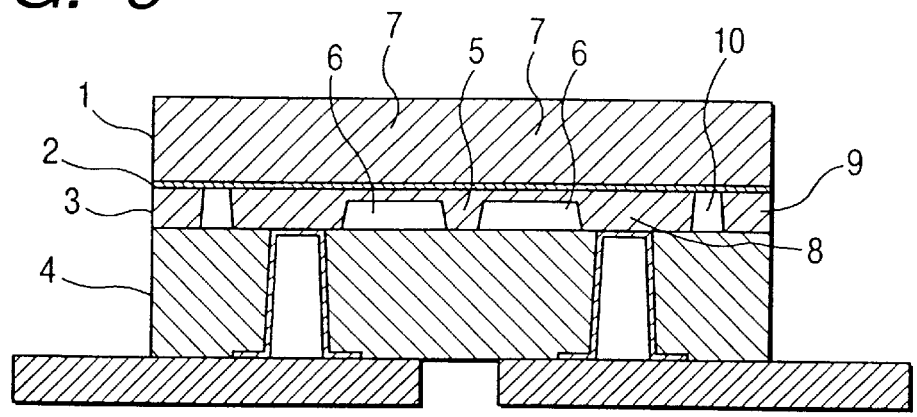
FIG. 5 is a view of another embodiment of the SOI semiconductor type combustion pressure sensor of the present invention.

FIG. 5 shows another embodiment of the SOI semiconductor type combustion pressure sensor of the present invention. A strain gauge 5 is disposed at a center portion of a space 6 under a diaphragm 7, and as shown in the figure, the other end of the strain gauge 5 is connected to an insulation substrate 4. When a first silicon plate 1 is applied with a combustion pressure, a pressure applied to the diaphragm 7 is converted into a force compressing the strain gauge 5.

Figure 6:
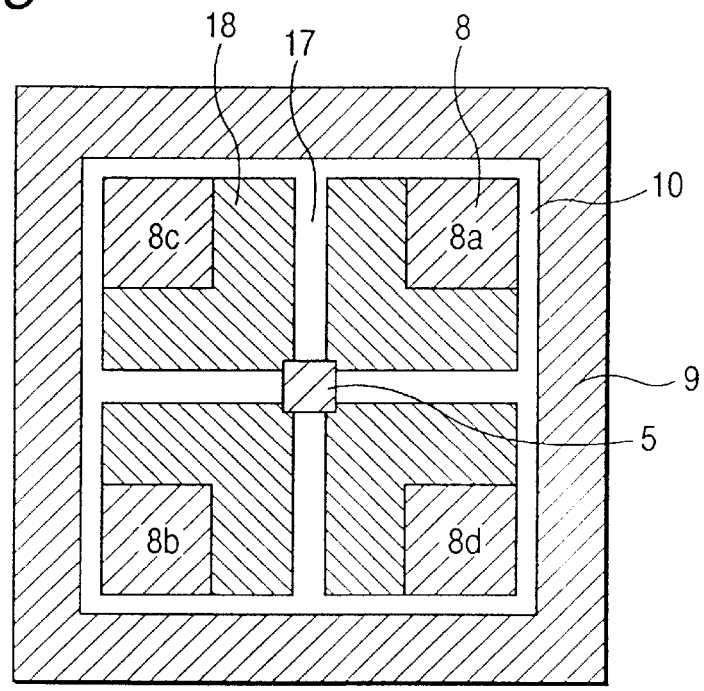
FIG. 6 is a plan view, seen from a strain gauge side, showing a SOI substrate according to one example of the embodiment shown in FIG. 5.

FIG. 6 is a plan view, seen from the space 6 side, showing a second silicon plate 3 of a SOI substrate according to one example of the embodiment shown in FIG. 5. The strain gauge 5 is formed in a square shape as shown in the figure, which is referred to as "square type gauge" hereinafter. A shear strain of the strain gauge 5 is changed depending on a combustion pressure, and accordingly, when a voltage is supplied between supporting portions 8a and 8b, a differential voltage is produced between supporting portions 8c and 8d, and a signal proportional to a combustion pressure can be outputted on the basis of the differential voltage.

Figure 7:
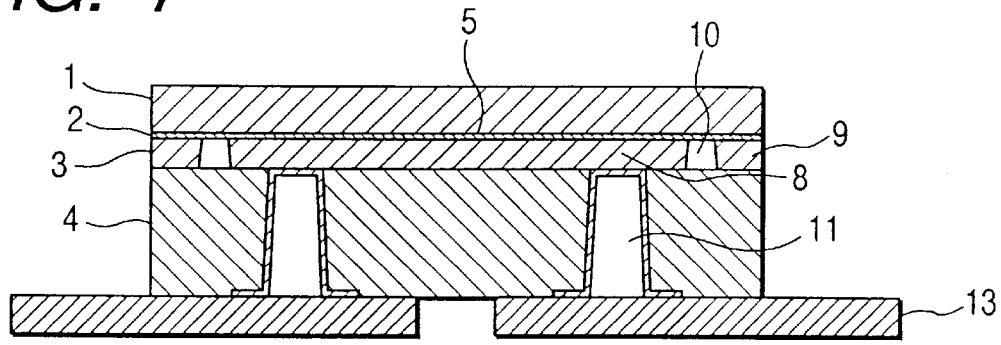
FIG. 7 is a view of a further embodiment of the SOI semiconductor type combustion pressure sensor of the present invention.

FIG. 7 shows a further embodiment of the SOI semiconductor type combustion pressure sensor of the present invention. As shown in this figure, any space is not formed under a strain gauge 5, and thereby no diaphragm is provided over the strain gauge 5. In this sensor, a combustion pressure is sensed by making use of a difference in Young's modulus between a SOI substrate including a first silicon substrate 1, a thermal oxide film 2, and a second silicon plate 3 and an insulation substrate 4. In addition, the Young's modulus of the SOI substrate is larger than that of the insulation substrate 4. When the entire sensing portion shown in the figure is exposed to a combustion gas atmosphere, the SOI substrate and the insulation substrate 4 are each compressed by a combustion pressure in such a manner that the insulation substrate 4 having a small Young's modulus contracts more than the SOI substrate does. As a result, the laminated body composed of the SOI substrate and the insulation substrate 4 is subjected to bending deformation such that the SOI substrate side projects. The electric resistance of the strain gauge 5 is thus changed depending on a combustion pressure. In other words, a combustion pressure can be sensed on the basis of a change in electric resistance of the strain gauge 5.

Figure 8:
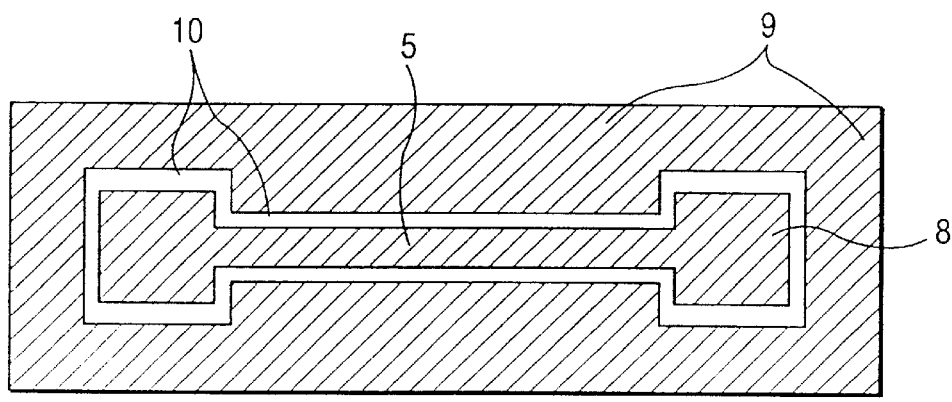
FIG. 8 is a plan view, seen from a strain gauge side, showing a SOI substrate according to one example of the embodiment shown in FIG. 7.

FIG. 8 is a plan view, seen from the lower side of the strain gauge 5, showing the second silicon plate 3 of the SOI substrate according to one example of the embodiment shown in FIG. 7. The strain gauge 5 is formed in an I-shape as shown in the figure, which is referred to as "I-type gauge" hereinafter. Supporting portions 8 formed with conductive films are disposed on both sides of the I-type strain gauge 5.

Figure 9:
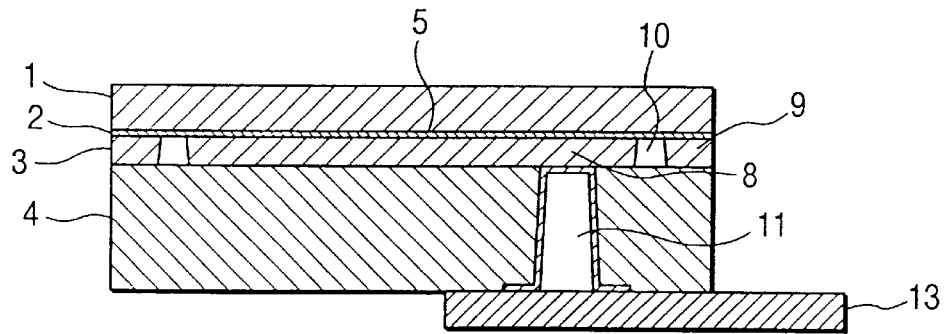
FIG. 9 is a view of an additional embodiment of the SOI semiconductor type combustion pressure sensor of the present invention.

FIG. 9 shows an additional embodiment of the SOI semiconductor type combustion pressure sensor of the present invention. The sensing principal for a combustion pressure makes use of a difference in Young's modulus, as in the embodiment shown in FIG. 7. A supporting portion 8, a though-hole 11 and a lead 13 are provided only on one side of the sensing device (on the right side, in the figure).

Figure 10:
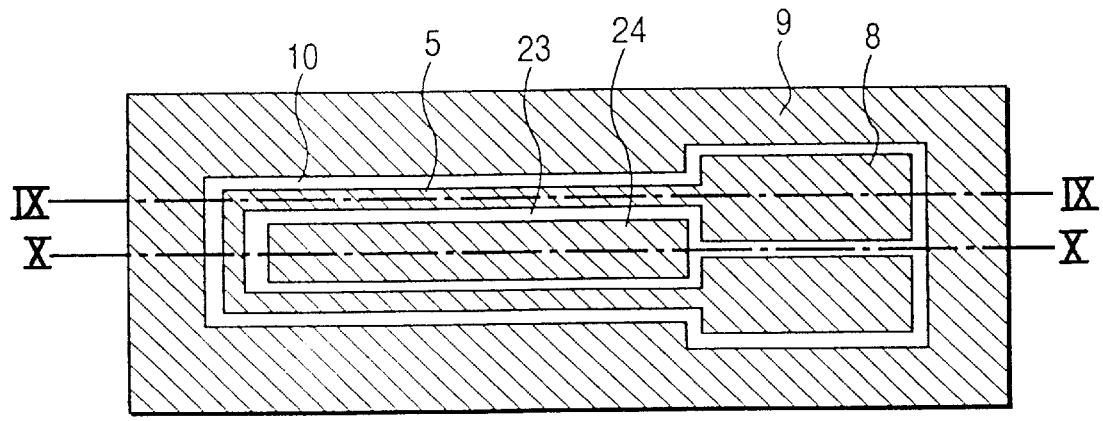
FIG. 10 is a plan view, seen from a strain gauge side, showing a SOI substrate according to one example of the embodiment shown in FIG. 9.

FIG. 10 is a plan view, seen from the lower side of a strain gauge 5, showing a second silicon plate 3 of a SOI substrate according to one example of the embodiment shown in FIG. 9. The center line of the sensing portion is a line X—X, and the cross-section taken on line X—X is shown in FIG. 9. A center member 24 is formed by etching in such a manner as to be bonded to an insulation substrate 4, and the strain gauge 5 is disposed in such a U-shape as to surround the center member 24 and a space 23. The strain gauge 5 is electrically insulated from an external frame portion 9 by a space 10. The sensing principal for a combustion pressure is the same as described in the embodiment shown in FIG. 7. The strain gauge 5 having the shape shown in this figure is referred to as "I-type gauge". The second silicon plate 3 used for the square type gauge shown in FIG. 6, and the I-type gauges shown in FIGS. 8 and 10 is made from a p-type single crystal wafer having a (100) face and also having a resistivity of from 0.01 to 1.0 Ωcm.

Figure 11:
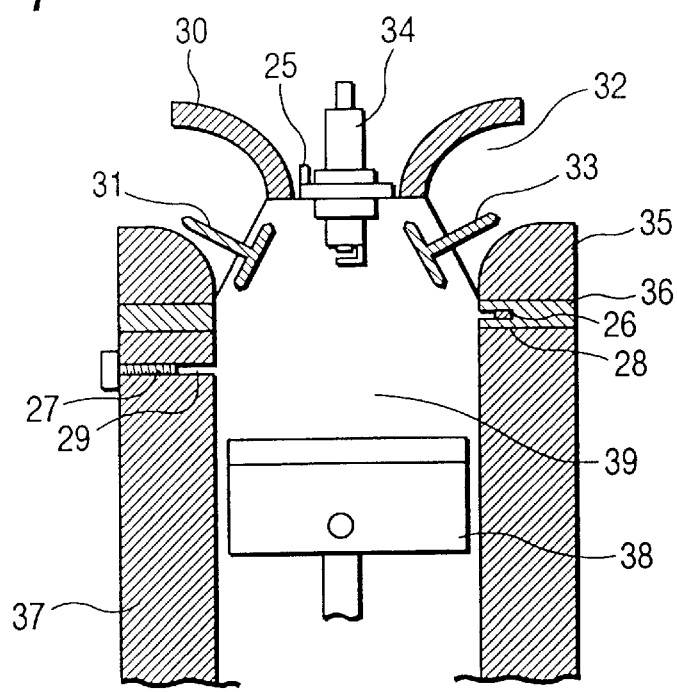
FIG. 11 is a view showing a method of mounting a combustion pressure sensor of the present invention to an automobile engine.

FIG. 11 is a sectional view of one cylinder of an automobile engine, illustrating mounting of the combustion pressure sensor of the present invention to the automobile engine. In this figure, reference numeral 30 indicates an intake pipe; 31 is an intake valve; 32 is an exhaust pipe; 33 is an exhaust valve; 34 is a spark plug; 35 is a cylinder head; 36 is a gasket; 37 is a cylinder block; 38 is a piston; and 39 is combustion chamber. Combustion pressure sensors 25, 26 and 27 of the present invention are mounted in the engine as follows: namely, the sensor 25 is integrated with the spark plug 34; the sensor 26 is disposed in the gasket 36, in which a combustion pressure in the combustion chamber 39 is introduced to a sensing portion of the sensor 26 through a combustion pressure introducing hole 28; and the sensor 27 is mounted in a combustion pressure introducing hole 29 provided in the cylinder block 37 (or cylinder head 35).

Figure 12:
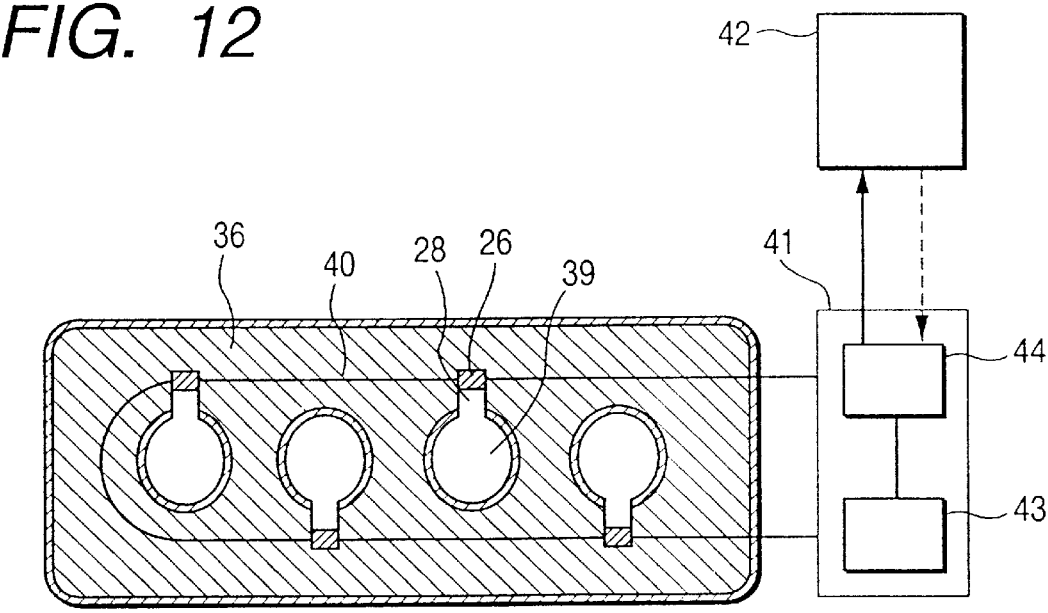
FIG. 12 is a view showing a method of sensing engine combustion pressures in multiple cylinders according to the present invention.

FIG. 12 shows a method of measuring combustion pressures in multiple cylinders of an engine according to the present invention. In this figure, an engine having four cylinders containing four combustion chambers 39 is shown. The four combustion pressure sensors 26 are disposed in a gasket 36 as shown in the figure, and combustion pressures in the cylinders are each introduced to sensing portions of the sensors 26 through combustion pressure introducing holes 28. The four sensors 26 are connected to a signal processor circuit 41 by way of a wiring. The signal processor circuit 41 is composed of an amplifier unit 43 for amplifying an output signal in the order of several ten mV of the sensor 26 into a signal in the order of several V, and a sensitivity adjustment unit 44 for adjusting variations in magnitude of the output signal from each sensor 26 and adjusting the sensitivity of a combustion pressure sensed by each sensor 26. The signal processor circuit 41 is connected to a control unit 42 for controlling the automobile engine, and an output signal of a combustion pressure of each cylinder, which is converted into a voltage, to the control unit 42. The control unit 42 transmits information regarding whether or not the present engine cylinder is burned to the sensitivity adjustment unit 44 of the signal processor circuit 41, so that the sensitivity adjustment amount of the sensitivity adjustment unit 44 can be momently changed in accordance with a combustion cycle to adjust variations in sensitivity of the combustion pressure sensor 26. As a result, only one signal processor circuit may be provided for a plurality of combustion pressure sensors, to thereby reduce the cost of an engine combustion pressure sensing system.

Figure 13:
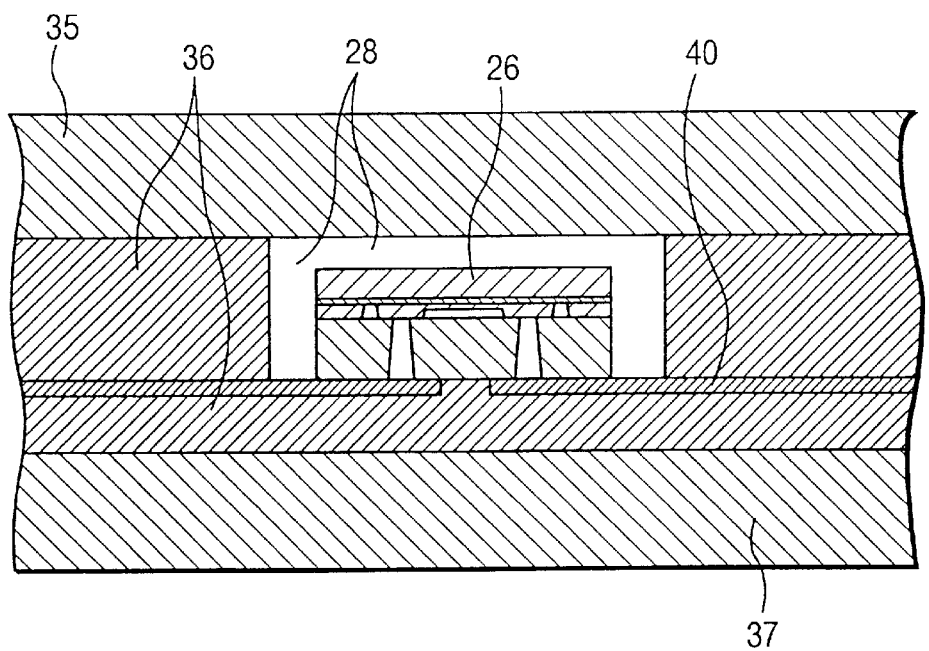
FIG. 13 is a view showing a more concrete configuration of mounting of a combustion pressure sensor of the present invention to an engine.

FIG. 13 shows a more concrete configuration of mounting of a combustion pressure sensor of the present invention to an engine. A combustion pressure sensor 26 is mounted in a gasket 36 portion between a cylinder head 35 and a cylinder block 37, wherein an combustion pressure of the engine is introduced toward the combustion pressure sensor 26 through a combustion pressure introducing hole 28 provided in the gasket 36 portion. The combustion pressure sensor 26 is electrically connected to an external signal processor circuit through a wiring 40 insulated from the gasket 36.

Figure 14A:
FIGS. 14A–C is a schematic connection diagram of various strain gauges.
Figure 14B:
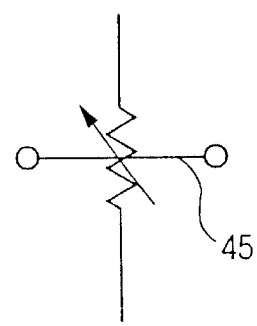
Figure 14C:
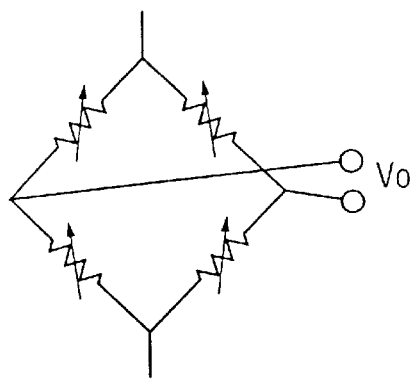

FIG. 14 is a schematic diagram showing a method of converting a change in electric resistance depending on a combustion pressure into a voltage signal in each strain gauge. FIG. 14-A shows a method for an I-type gauge, in which a constant current is supplied to the strain gauge and a combustion pressure is converted into a voltage signal on the basis of a voltage drop at the strain gauge. FIG. 14-B shows a method for an X-type gauge and a square type gauge, in which a constant voltage is supplied to the strain gauge and a combustion pressure is converted into a voltage signal on the basis of a differential voltage produced at an output line 45 of the strain gauge. FIG. 14-C shows a method for a bridge type gauge, in which two tangential gauges and radial gauges constituting a strain gauge portion are connected to each other in the known bridge circuit shown in the figure wherein a voltage is supplied to the bridge circuit and a combustion pressure is converted into a voltage signal on the basis of a differential voltage $V_0$ produced at the center portion of the bridge circuit.

Figure 15A:
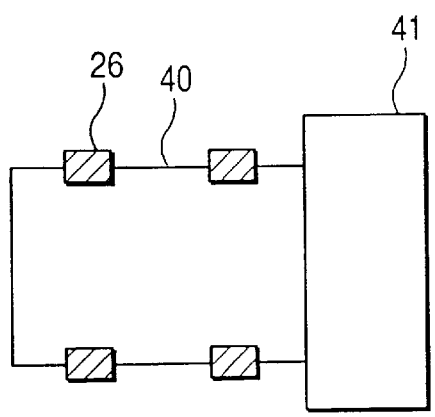
FIGS. 15A–B is a diagram showing connection of a group of combustion pressure sensors of the present invention.
Figure 15B:
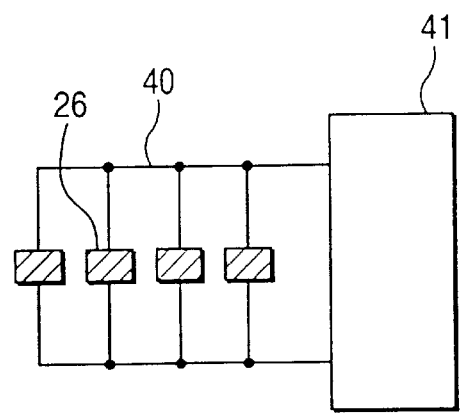

FIGS. 15A–B shows connection of a group of combustion pressure sensors of the present invention mounted to respective cylinders. FIG. 15-A shows a method in which combustion pressure sensors 26 are connected in series to a signal processor circuit 41 by means of a wiring 40. FIG. 15-B shows a method in which the combustion pressure sensors 26 are connected in parallel to the signal processor circuit 41 by means of the wiring 40. With these connection methods, only one signal processor circuit 41 may be provided for a group of a plurality of combustion pressure sensors 26, to thereby reduce the cost of the combustion sensing system.

Figure 16:
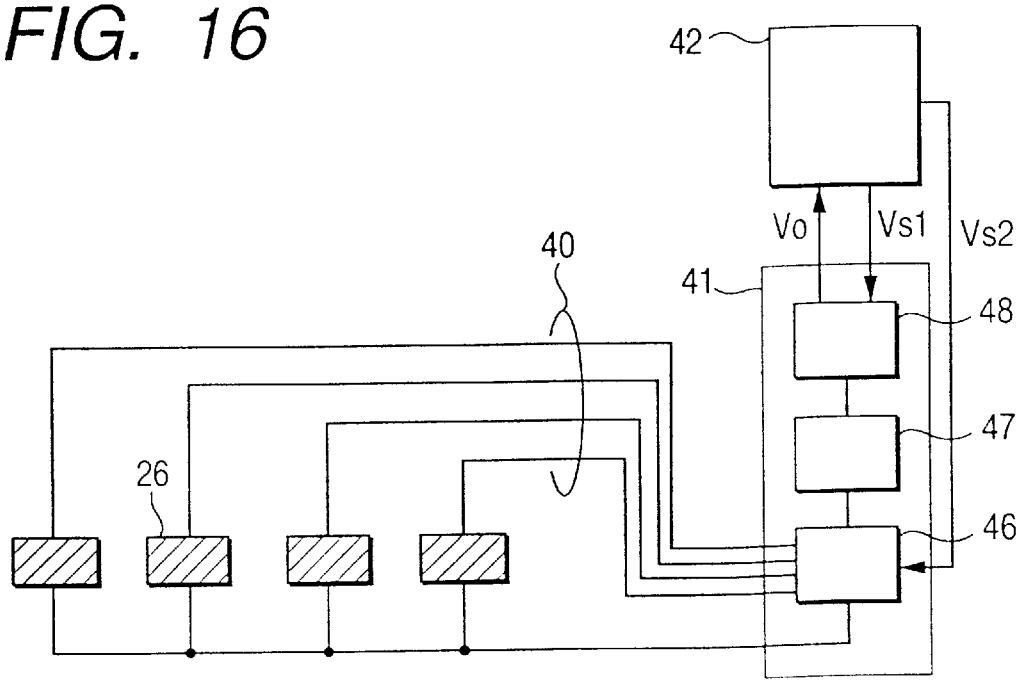
FIG. 16 is a diagram showing one example of a combustion pressure sensing system of the present invention, in which combustion pressure sensors are connected in parallel to a signal processor circuit.

FIG. 16 shows one example of a combustion pressure sensing system of the present invention, in which combustion pressure sensors are connected in parallel to a signal processor circuit. Combustion pressure sensors 26 in this figure are connected in pseudo-parallel to a signal processor circuit 41, differently from the simple parallel connection shown in FIG. 15-B. Specifically, respective combustion pressure sensors 26 are connected to switches 46 provided in the signal processor circuit 41 through independent wirings 40. The signal processor circuit 41 is composed of the switches 46, an amplifier unit 47, and a sensitivity adjustment unit 48. A control unit 42 of an engine decides a cylinder to be sensed and transmits a selection signal Vs2 for selecting the combustion pressure sensor to the corresponding switch 46, so that only the combustion pressure sensor 26 corresponding to the cylinder to be sensed is electrically connected to the signal processor circuit 41 through the switch 46. At the same time, the control unit 42 transmits a command signal Vs1 for adjusting a sensitivity variation due to a manufacturing variation of the combustion pressure sensor 26 to the sensitivity adjustment unit 48. As a result, the combustion pressure sensors 26 of respective cylinders are continuously connected to the signal processor circuit 41 through the switches 46 in accordance with a combustion cycle of the engine. Thus, a voltage signal in the order of several ten mV created at the strain gauge of the sensing portion of each combustion pressure sensor 26 is amplified into a voltage in the order of several V at the amplifier unit 47, being subjected to sensitivity correction at the sensitivity adjustment unit 48, and is supplied to the control unit 42 as an output signal $V_0$ corresponding to the combustion pressure at a high accuracy. In addition, the sensitivity correction amounts of respective combustion pressure sensors 26 are previously stored in the control unit 42 or the signal processor circuit 41, and are sequentially read out in accordance with the combustion cycle and processed in the sensitivity adjustment unit 48.

Figure 17:
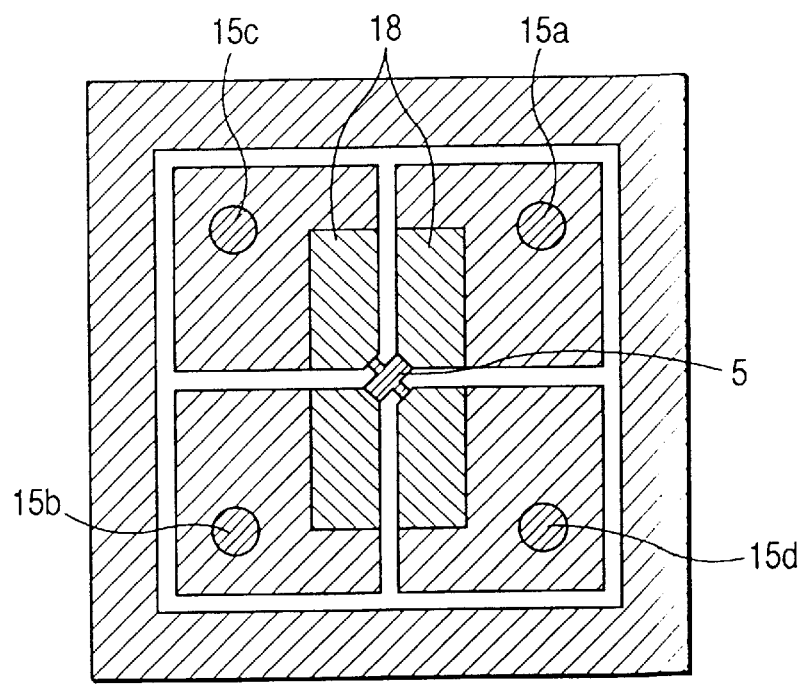
FIG. 17 is a plan view of a second silicon plate of a SOI substrate according to a further embodiment of the present invention.

FIG. 17 is a plan view of a second silicon plate of a SOI substrate according to a further embodiment of the present invention. As compared with the combustion pressure sensor shown in FIG. 3 in which the thickness of the thinned portion 18 is the same as that of the strain gauge portion 5, the combustion pressure sensor shown in FIG. 17 has a configuration that a thinned portion 18 has a thickness larger than that of a strain gauge 5. In this sensor, since an electric resistance between a conductive film 15a and a conductive film 15b can be concentrated at the strain gauge 5 portion more than in the sensor shown in FIG. 3, the sensitivity of the sensing portion to a combustion pressure to be sensed can be increased.

Figure 18:
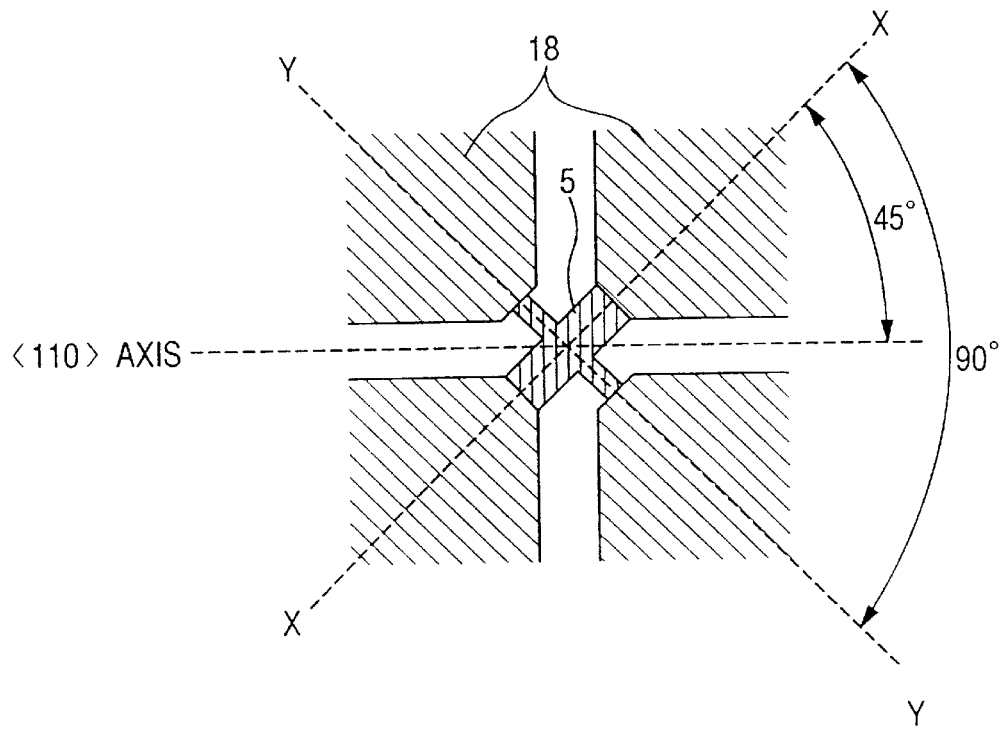
FIG. 18 is enlarged view of the strain gauge portion of the sensor shown in FIG. 17.

FIG. 18 is an enlarged view of the strain gauge 5 portion of the sensor shown in FIG. 17. The strain gauge 5 shown by slant lines, which has a width along an X—X axis wider than that along a Y—Y axis, is adapted to receive a voltage along the X—X axis and sense a combustion pressure on the basis of a differential voltage produced along the Y—Y axis. In addition, the X—X axis and the Y—Y axis are each inclined 45° with respect to the <110> axis of the second silicon plate 3.

Figure 19:
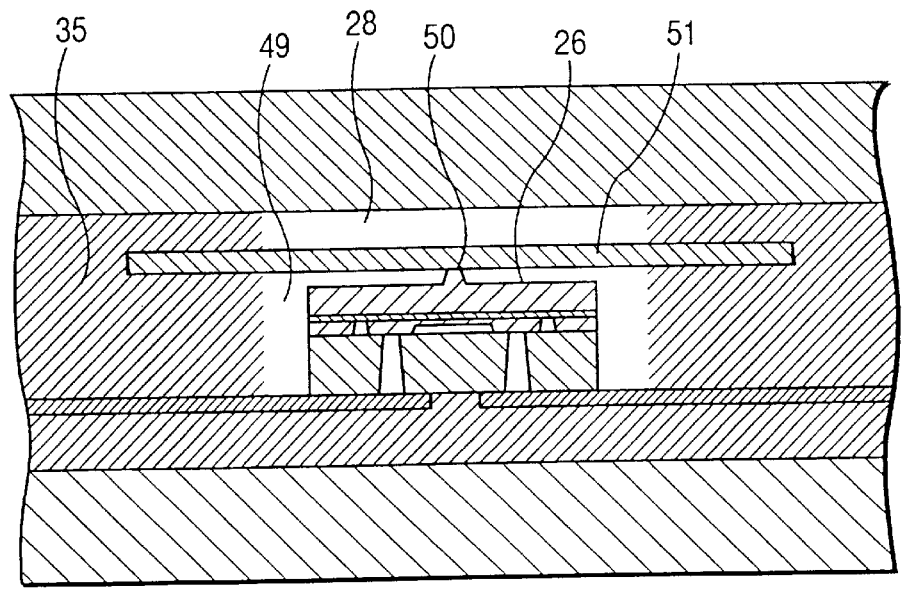
FIG. 19 is a view showing another embodiment of mounting of a combustion pressure sensor of the present invention to an engine.

FIG. 19 shows another embodiment of mounting of a combustion pressure sensor of the present invention to an engine. In this embodiment, a combustion pressure sensor 26 is mounted in a gasket 36 portion, like the embodiment shown in FIG. 13. As compared with the combustion pressure sensor 26 shown in FIG. 13 which is directly exposed to a combustion gas, the combustion pressure sensor 26 shown in FIG. 19 is disposed in a region 49 separated from a combustion gas atmosphere. A combustion pressure introduced into a combustion pressure introducing hole 28 is converted into a force by a diaphragm 51 made from a metal material or the like which is mounted in the gasket 36, and the force is transmitted to a projection 50 formed by etching on the surface of a first silicon plate of the combustion pressure sensor 26. An electric resistance of a strain gauge portion of the combustion pressure sensor 26 is changed depending on the force transmitted to the projection 50. The combustion pressure is thus sensed on the basis of a change in electric resistance of the strain gauge portion.

Figure 20:
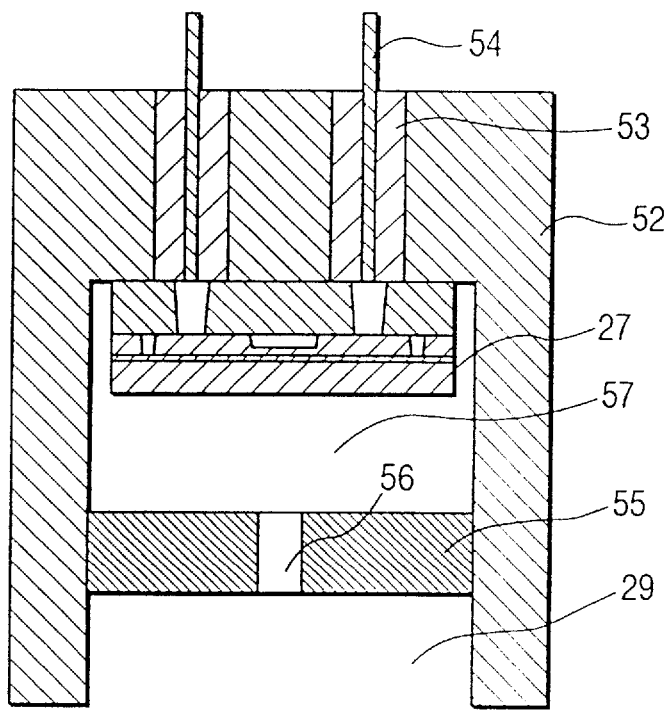
FIG. 20 is a view showing a further embodiment of mounting of a combustion pressure sensor of the present invention to an engine.

FIG. 20 shows a further embodiment of mounting of a combustion pressure sensor of the present invention to an engine. In this embodiment, a combustion pressure sensor 27 is mounted in a combustion pressure introducing hole 29 portion provided in a cylinder block or cylinder head. The combustion pressure sensor 27 is bonded to a case 52 made from a metal material or the like. Leads 54 for electrically connecting the combustion pressure sensor 27 to an external signal processor circuit are electrically insulated from the case 52 by means of insulating members 53. A combustion pressure of an engine is introduced through a hole 56 provided in the member 55 into a region 57 surrounding the combustion pressure sensor 27. With this configuration, it becomes possible to suppress a temperature of the combustion pressure sensor 27 portion at about 500° C. or less, and hence to enhance durability of the sensing portion.

Figure 21:
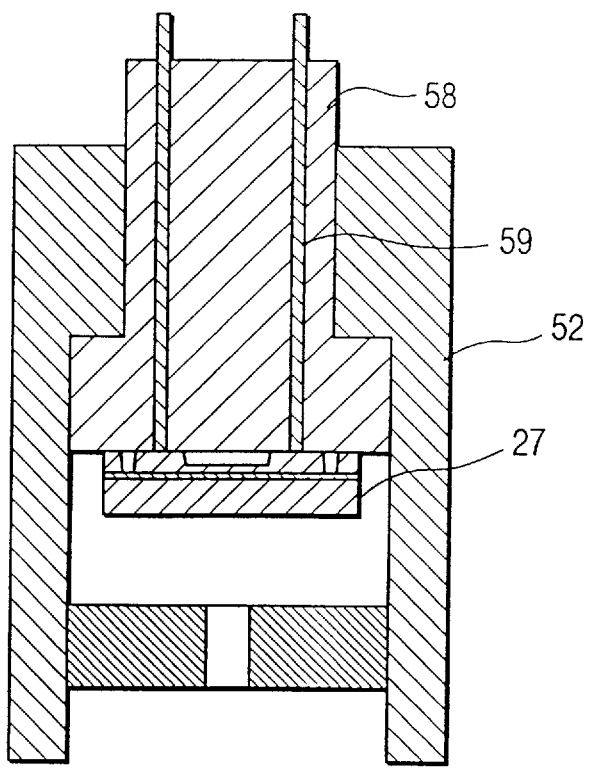
FIG. 21 is a view showing a further embodiment of mounting of a combustion pressure sensor of the present invention to an engine.

FIG. 21 shows a further embodiment of mounting of a combustion pressure sensor of the present invention to an engine. This embodiment is different from the embodiment shown in FIG. 20 in that an insulating member 58 such as glass ceramics is fixed on a case 52, and a combustion pressure sensor 27 is bonded to the insulating member 58 by anodic bonding or the like. The combustion pressure sensor 27 is electrically connected to an external signal processor circuit through leads 59 sealed in the insulating member 58.

Figure 22:
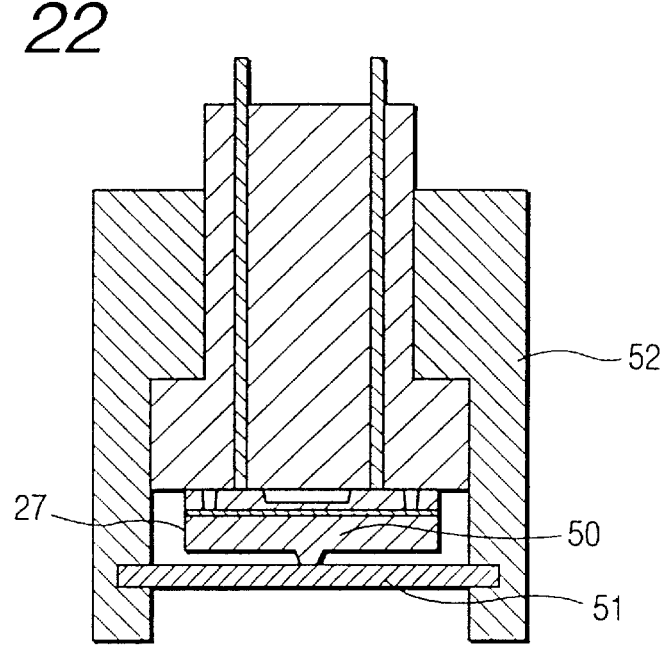
FIG. 22 is a view showing a further embodiment of mounting of a combustion pressure sensor of the present invention to an engine.

FIG. 22 shows a further embodiment of mounting of a combustion pressure sensor of the present invention to an engine. This embodiment is different from the embodiment shown in FIG. 21 in that a combustion pressure is converted into a force by means of a diaphragm 51 made from a metal material or the like and the force is applied to a projection 50 provided on the combustion pressure sensor 27, to thus sense the combustion pressure. The combustion pressure sensor 27 is insulated from a combustion gas atmosphere, like the embodiment shown in FIG. 19.

Figure 23:
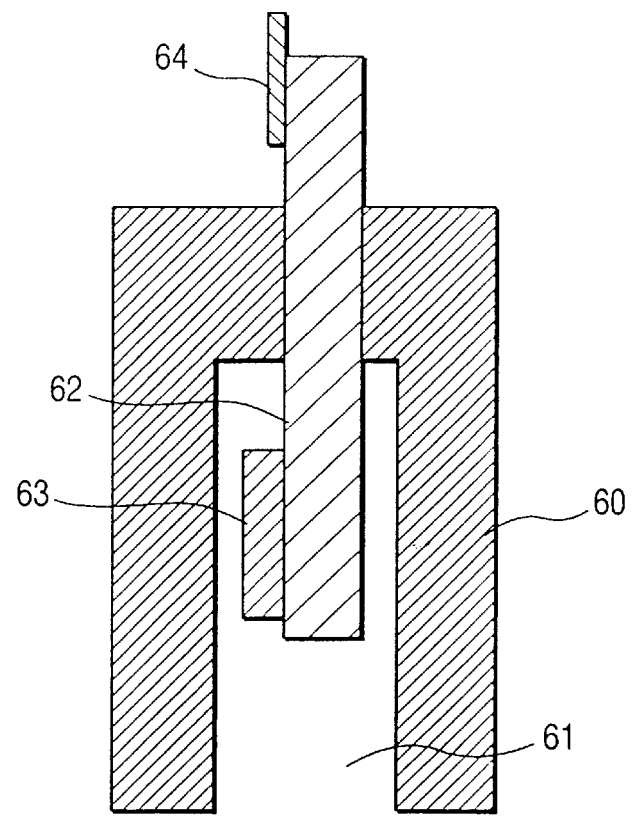
FIG. 23 is a view showing a further embodiment of mounting of a combustion pressure sensor of the present invention to an engine.

FIG. 23 shows a further embodiment of mounting of a combustion pressure sensor of the present invention to an engine. In this embodiment, a combustion pressure sensor 63 is bonded to a flat insulation substrate 62 hermetically fixed into a case 60, and it is exposed to a combustion gas introduced through a combustion pressure introducing hole 61. The combustion pressure sensor 63 is electrically connected to an external signal processor circuit through a lead 64.

Figure 24:
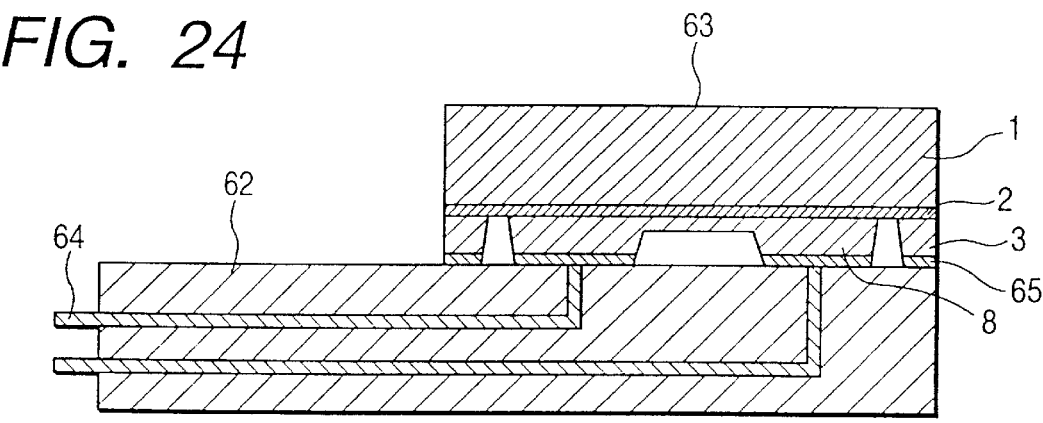
FIG. 24 is an enlarged view showing the combustion pressure sensor bonded to a flat insulation substrate shown in FIG. 23.

FIG. 24 is an enlarged view of the combustion pressure sensor bonded to the flat insulation substrate shown in FIG. 23. The combustion pressure sensor 63 composed of a SOI substrate including a first silicon plate 1, a thermal oxide film 2, and a second silicon plate 3. The flat insulation substrate 62 is formed of a multi-layered sintered body of ceramics such as mullite or alumina, and it hermetically contains the lead 64. The combustion pressure sensor 63 is hermetically bonded with the flat insulation substrate 62 by means of a brazing material 65 mainly containing silver, nickel or gold, and a supporting portion 8 is electrically connected to the lead 64 through the brazing material 65 upon bonding of the combustion pressure sensor 63. In addition, the bonding temperature is determined, depending on the brazing material 65, at least 600° C. or more.

Figure 25:
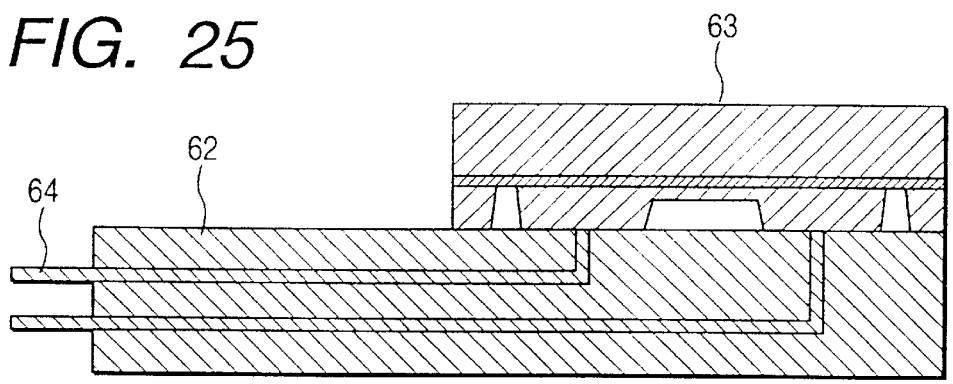
FIG. 25 is an enlarged view showing another example of the combustion pressure sensor bonded to the flat insulation substrate shown in FIG. 23.

FIG. 25 shows another example of the combustion pressure sensor bonded to the flat insulation substrate shown in FIG. 23. The combustion pressure sensor 63 has the same structure as that shown in FIG. 24, except that the flat insulation substrate 62 shown in FIG. 25 is made from glass ceramics. The second silicon plate of the combustion pressure sensor 63 is hermetically bonded to the flat insulation substrate 62 at a temperature of several hundred °C. by anodic bonding.

Figure 26:
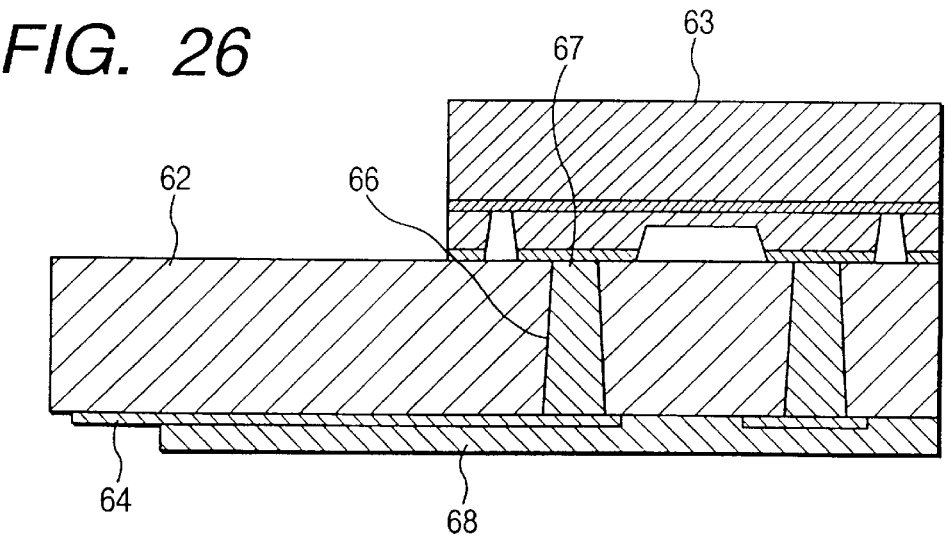
FIG. 26 is an enlarged view of a further example of the combustion pressure sensor bonded to the flat insulation substrate shown in FIG. 23.

FIG. 26 is an enlarged view of a further example of the combustion pressure sensor bonded to the flat insulation substrate shown in FIG. 23. The combustion pressure sensor 63 is hermetically bonded to the flat insulation substrate 62 by means of a brazing material, and the lead 64 is formed on the surface of the flat insulation substrate 62, part of the lead 64 being coated with anti-corrosion protective film 68. Through-holes 66 provided in the flat insulation substrate 62 are filled with a conductive material 67. The combustion pressure sensor 63 is electrically connected to an external signal processor circuit through the conductive material 67 and the lead 64. In addition, although the flat insulation substrate shown in FIG. 26 is made from ceramics such as mullite or alumina and is bonded by means of a brazing material, it may be of course made from glass ceramics and bonded by anodic bonding.

Figure 27:
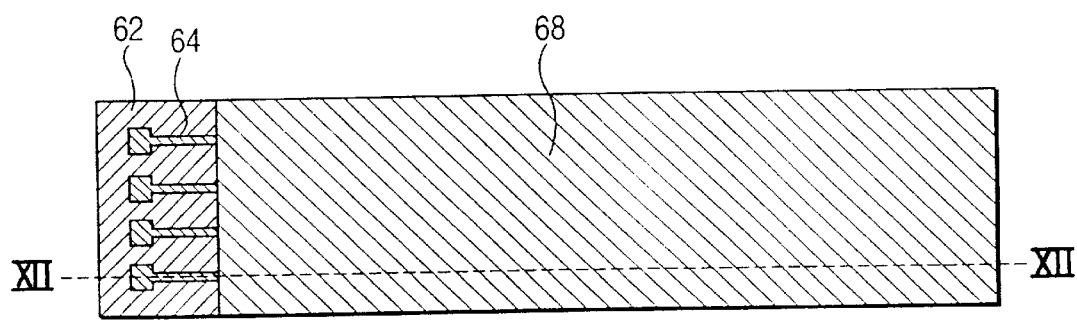
FIG. 27 is a plan view, seen from bottom, showing mounting of the sensing portion shown in FIG. 26.

FIG. 27 is a plan view, seen from bottom, showing mounting of the sensing portion shown in FIG. 26. As shown in this figure, four pieces of the leads 64 are formed by printing on the surface of the flat insulation substrate 62, and are coated with the protective film 68 excluding the left ends. In addition, the cross-section taken on line XII—XII is shown in FIG. 25.

Figure 28:
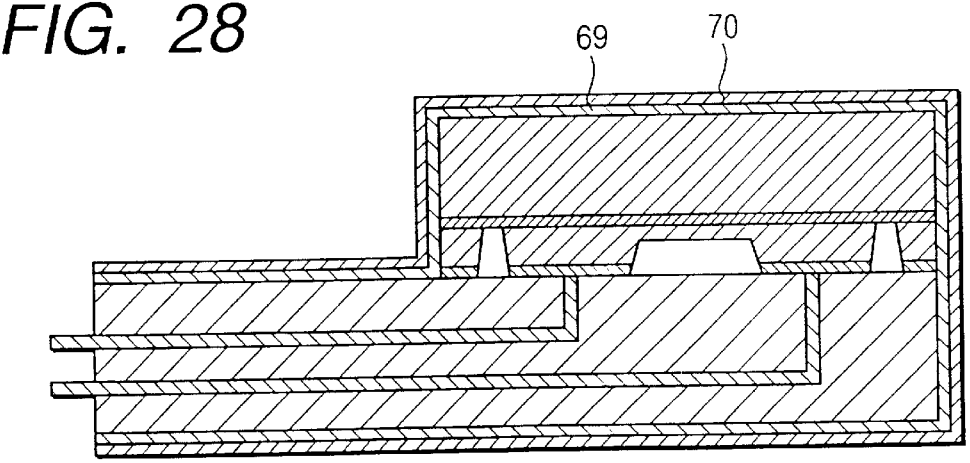
FIG. 28 is an enlarged view of a further example of the combustion pressure sensor bonded to a flat insulation substrate.

FIG. 28 is an enlarged view of a further example of the combustion pressure sensor bonded to the flat insulation substrate. This example is different from the configuration shown in FIG. 24 in that a conductive coating film 69 for reducing electric noise and an anti-corrosion coating film 70 for preventing corrosion due to a combustion gas are formed on the surface of the sensing portion.

The above-described embodiments of the present invention have the following functional effects.

Since a strain gauge is formed on a thermal oxide film by etching part of a second silicon plate of a SOI substrate, an insulation resistance between the strain gauge portion and first or second silicon plate is extremely higher, that is, a leak current therebetween is very small, with a result that the sensing portion can be easily mounted on a high temperature portion. The strain gauge portion is sealed between the first silicon plate of the SOI substrate and an insulation substrate and between the second silicon plate of the SOI substrate and the insulation substrate; and the thickness of the first silicon plate is set at a relatively large value of several hundred $\mu$m, the thickness of the insulation substrate is set at a relatively large value of several hundred $\mu$m, and the length of a bonding portion between the second silicon plate and the insulation substrate is set at a relatively large value of several hundred $\mu$m, and accordingly even when a combustion gas pressure in a high temperature atmosphere is rapidly changed in synchronization with a combustion cycle of an automobile, the temperature change of the strain gauge portion is made extremely moderate, and thereby a combustion pressure can be sensed at a high accuracy without any temperature effect. Moreover, since the surface of the sensing portion is coated with a corrosion preventive material and/or an electric noise reducing material, it becomes possible to sense a combustion pressure at a high accuracy without degradation of reliability of the sensing portion even if the sensing portion is directly exposed to a combustion gas atmosphere through a combustion pressure introducing hole. In addition, since the combustion pressure sensor can be directly exposed to a combustion gas atmosphere, it becomes possible to realize a small-sized inexpensive combustion pressure sensor, and hence to increase the degree of freedom of mounting of the sensor to an engine.

Since a group of switches are provided between a group of combustion pressure sensors each mounted to engine cylinders so that only the combustion pressure sensor of a specified cylinder is substantially electrically connected to a signal processor circuit in accordance with a combustion cycle of the engine, it becomes possible to sense combustion pressures of multiple cylinders using only one signal processor circuit without provision of signal processor circuits in the same number as that of the combustion pressure sensors, and hence to reduce the cost of the combustion pressure sensing system. In addition, since only one combustion pressure sensor is substantially connected to the signal processor circuit at each combustion cycle, it becomes possible to sense the combustion pressure at a high accuracy.

The present invention, as described above, provides a small-sized SOI semiconductor type combustion pressure sensor improved in mounting to an engine, which is capable of sensing combustion pressures of all engine cylinders at a high accuracy and a high reliability and sensing abnormal combustion such as knocking at a high accuracy. The present invention also provides a system for sensing combustion pressures for all engine cylinders at a low cost. In addition, the present invention provides a pressure sensor having a configuration that a sensing portion thereof is allowed to be exposed to a dirty environment, which is particularly suitable for sensing a fuel pressure or an oil pressure.

While the preferred embodiments of the present invention have been described using specific terms, such description is for illustrative purposes only, and it is to be understood that changes and variations may be made without departing from the spirit or scope of the following claims.

What is claimed is:

1. A semiconductor type combustion pressure sensor comprising:
    a silicon-on-insulator device having a three-layered structure of a first silicon plate, a thermal oxide film, and a second silicon plate;
    a strain gauge portion etched formed from a portion of one of said silicon plates; and
    an insulation substrate configured to accommodate electrical leads being connected to said second silicon plate to seal said strain gauge portion;
    wherein a pressure or a force applied to said first silicon plate provides sensing of a combustion pressure.

2. A semiconductor type combustion pressure sensor according to claim 1, wherein said second silicon plate and said insulation substrate are bonded for hermetically sealing said strain gauge portion.

3. A semiconductor type combustion pressure sensor according to claim 2, wherein said strain gauge portion is composed of any one of an X-type gauge, a bridge type gauge, a square type gauge, and an I-type gauge.

4. A semiconductor type combustion pressure sensor according to claim 3, wherein said insulation substrate is formed of any one of a glass plate, a glass ceramic plate, and a ceramic plate.

5. A semiconductor type combustion pressure sensor according to claim 4, wherein said insulation substrate, when it is formed of a glass plate or a glass ceramic plate, is bonded to said silicon-on-insulator by anodic bonding, and said insulation substrate, when it is formed of a ceramic plate, is bonded to said silicon-on-insulator by brazing.

6. A semiconductor type combustion pressure sensor according to claim 4, wherein a surface of a sensing portion composed of said silicon-on-insulator device and said insulation substrate is coated with a corrosion preventive material and/or an electric noise reducing material.

7. A semiconductor type combustion pressure sensor according to claim 4, wherein said combustion pressure sensor is mounted in a gasket, a combustion pressure introducing hole provided in a cylinder block, or a spark plug, of an automobile engine.

8. A semiconductor type combustion pressure sensor according to claim 1, wherein said strain gauge portion has a connection part arranged to be electrically connected to an external signal processor circuit through a conductive layer formed on an inner surface of a through-hole portion.

9. A semiconductor type combustion pressure sensor according to claim 8, wherein said through-hole portion is filled with a metal material.

10. A semiconductor type combustion pressure sensor according to claim 1, wherein a combustion pressure sensing apparatus is provided in which the sensor is provided in multiples with each sensor mounted in a respective engine cylinder so as to be electrically connected with each other, thereby continuously sensing combustion pressures of multiple engine cylinders via signal processor circuits in a number smaller than the number of the multiple sensors.

11. A semiconductor type combustion pressure sensor according to claim 1, wherein a combustion pressure sensing apparatus is provided in which the sensor is provided in multiple numbers with each one of the sensors mounted in respective ones of engine cylinders, a signal processor circuit for processing signals regarding combustion pressures; and switches provided between said group of sensors and said signal processor circuit; wherein only one of said sensors, mounted to a specified cylinder, is substantially connected to said signal processor circuit in accordance with a combustion cycle.

12. A semiconductor type combustion pressure sensor according to claim 11, wherein said signal processor circuit is configured to amplify a signal transmitted from a sensing portion of said combustion pressure sensor and adjust a sensitivity with respect to a combustion pressure at a desired value.

13. A semiconductor type combustion pressure sensor according to claim 11, wherein a control unit is provided to determine the cylinder to be sensed with respect to combustion pressure thereof in accordance with a combustion cycle and to allow said sensor provided in said cylinder to be connected to said signal processor circuit.

14. A semiconductor type pressure sensor comprising:
    a silicon-on-insulator having a three-layered structure of a first silicon plate, a thermal oxide film, and a second silicon plate;
    a strain gauge portion etched formed from a portion of one of said silicon plates; and
    an insulation substrate configured to accommodate electrical leads being connected to said second silicon plate in such a manner as to seal said strain gauge portion;
    a sensed pressure or a force applied to said first silicon plate is representative of a pressure desired to be sensed.

15. A semiconductor type combustion pressure sensor according to claim 14, wherein the pressure desired to be sensed is one of a combustion pressure, a fuel pressure, and an oil pressure.

* * * * *